(12) United States Patent
Gallego et al.

(10) Patent No.: US 8,678,420 B2
(45) Date of Patent: Mar. 25, 2014

(54) SYSTEM FOR AUTOMATIC ADJUSTMENT OF THE GAP BETWEEN A TRACTOR VEHICLE AND AN ATTACHED TRAILER

(75) Inventors: José Manuel Algüera Gallego, Aschaffenburg (DE); Martin Richter, Frankfurt (DE)

(73) Assignee: Jost-Werke GmbH, Neu-Isenburg (DE)

( * ) Notice: Subject to any disclaimer, the term of this patent is extended or adjusted under 35 U.S.C. 154(b) by 119 days.

(21) Appl. No.: 13/365,475

(22) Filed: Feb. 3, 2012

(65) Prior Publication Data

US 2012/0200064 A1    Aug. 9, 2012

(30) Foreign Application Priority Data

Feb. 8, 2011 (DE) .......................... 10 2011 003 791

(51) Int. Cl.
*B60D 1/42* (2006.01)
*B60D 1/155* (2006.01)

(52) U.S. Cl.
USPC ....................... 280/446.1; 280/407

(58) Field of Classification Search
USPC .............................. 280/446.1, 407
See application file for complete search history.

(56) References Cited

FOREIGN PATENT DOCUMENTS

| DE | 33 33 231 A1 | 3/1985 |
|----|--------------|--------|
| DE | 41 36 334 C1 | 4/1993 |
| DE | 195 07 034 A1 | 9/1996 |
| FR | 2646812 A1 * | 11/1990 |
| FR | 2692202 A1 * | 12/1993 |

* cited by examiner

*Primary Examiner* — Kevin Hurley
(74) *Attorney, Agent, or Firm* — Hudak, Shunk & Farine Co. LPA (57) ABSTRACT

A system is specified for the automatic adjustment of a gap between a tractor vehicle and an attached trailer, with a length-adjustable hitch with a tension tube, at the end of which is arranged a tension lug, while the tension lug can travel in the vehicle's lengthwise axis relative to the tension tube by an actuator along a predetermined travel path, as well as a control unit. The basic problem of the invention was to provide a system with which the gap between tractor vehicle and trailer can be changed automatically in driving operation and depending on the speed, both for articulated and unarticulated trailers. The problem is solved according to the invention with a system in which the control unit is an electronic controller, which is hooked up to a speed pickup for the processing of a speed signal and connected to the actuator.

18 Claims, 4 Drawing Sheets

SYSTEM FOR AUTOMATIC ADJUSTMENT OF THE GAP BETWEEN A TRACTOR VEHICLE AND AN ATTACHED TRAILER

FIELD OF THE INVENTION

The invention concerns a system for the automatic adjustment of a gap between a tractor vehicle and an attached trailer, comprising a length-adjustable, especially a telescoping hitch with a tension tube, at the end of which is arranged a tension lug, while the tension lug can travel in the vehicle's lengthwise axis relative to the tension tube by means of an actuator along a predetermined travel path, as well as a control unit.

BACKGROUND OF THE INVENTION

The tractor vehicle and the trailer in the coupled-together condition form a load train or articulated train, wherein both the tractor vehicle and the trailer are configured with a box-like, high-rising cargo space to maximize their transport volume. Especially when driving fast on a straight road, considerable vortices and turbulence occur around the gap between tractor vehicle and trailer, having a negative impact on the fuel consumption and the exhaust emissions. However, it is only possible to reduce the gap on a straight roadway, since on curved roadways there is a risk of the trailer colliding with the tractor vehicle. Accordingly, after reducing the gap during road travel it is absolutely necessary to restore a sufficiently large gap once again in event of a panic braking or an avoidance maneuver, while the term "automatic" means an adjustment of the gap internal to the system, that is, without human intervention.

In the past, efforts have already been made to reduce the gap during straight travel of the articulated train and to increase it when traveling on a curve in order to prevent a bumping of the opposite corners of the cargo space of the tractor vehicle and trailer. One generic prior art is formed by DE 33 33 231 A1 with a hitch that can be adjusted by means of a hydraulic slave cylinder, where the slave cylinder is fed from a master cylinder arranged underneath the rim bearing. As soon as the front axle of the trailer turns, the piston of the master cylinder is retracted or extended and it forces hydraulic fluid out from the master cylinder and into the slave cylinder, which in turn moves the tension lug in the axial direction of the hitch. The major drawback of this known hitch is that it only works with trailers having an articulated front axle and cannot be installed on trailers with rigid hitch. Another drawback is the exclusively angle-dependent control of the length-adjustable hitch, not taking into account the travel speed of the articulated train. Furthermore, this known type of constrained control generally works well as long as the geometrical relations of tractor vehicle and trailer do not change, that is, the trailer is always pulled by the same tractor vehicle. But if the trailer is pulled by different tractor vehicles with a chassis or cargo space contour differing from each other, there is a heightened risk of a collision of the trailer with the tractor vehicle upon sideways movement along a curve, due to too small a gap achieved between tractor vehicle and trailer.

A similar technical solution of a so-called short coupling system, which also enables the hauling of trailers with rigid hitch, is proposed by DE 41 36 334 C1, but here the slave cylinder located on the trailer is operated from a master cylinder arranged on the tractor vehicle, which in turn is activated by a mechanical gearing depending on the buckling angle between the tractor vehicle and the trailer.

It has become known from DE 195 07 034 A1 how to avoid damage to the forked draw-bar or mounted equipment of a tractor vehicle during backward movement of a truck with trailer. For this, a trailer coupling is provided with a coupling mouth, mounted so that it can swivel or be suspended on the cross beam of the chassis, and forced to swivel along with the forked draw-bar when the vehicle is steered accordingly. To detect the movement of the coupling mouth, sensors are arranged on either side of the opening of the coupling mouth. The sensors trigger an engine stop just before the forked draw-bar knocks against the chassis or other mounted equipment, so that the truck driver must first take other steps in order to operate his vehicle once again. The known truck draw-bar safety feature only works during slow maneuvering during backward movement and causes an engine shutdown when a given buckling between tractor vehicle and trailer is exceeded. This is a massive safety risk during fast highway driving and therefore it is not acceptable.

SUMMARY OF THE INVENTION

Therefore, the basic problem of the invention is to provide a system with which the gap between tractor vehicle and trailer can be changed automatically in driving operation and depending on the speed, both for articulated and unarticulated trailers.

The problem is solved according to the invention with a system in which the control unit is an electronic controller, which is hooked up to a speed pickup for the processing of a speed signal and connected to the actuator. Accordingly, the controller receives a metered value of the currently driven speed as its input quantity and puts out a corresponding signal to the actuator as its output quantity. The actuator thereupon adjusts the gap between the tractor vehicle and the trailer in dependence on the speed of travel. For this, a characteristic curve can be stored in the controller, plotting a constant functional setting of the gap as a function of the current speed of travel.

Basically, a larger gap is advantageous in the low speed range, since the aerodynamic disadvantages are of little effect and the articulated train is generally traveling on a stretch with many curves, which means large deflections about a vertical pivot axis between tractor vehicle and trailer. On the other hand, when traveling on the highway, the speed of travel increases and so do the aerodynamic effects of a large gap. The curves to be negotiated at high speed are generally gentle, so that only slight relative movements occur between the tractor vehicle and the trailer, and there is no chance of the trailer knocking against the chassis of the tractor vehicle.

According to a first preferred embodiment, the speed pickup is a speed sensor cooperating with the vehicle's transmission. This embodiment involves a modification of the tractor vehicle and it provides to the system of the invention an especially exact and near-simultaneous signal regardless of the rest of the electronic configuration.

Advantageously, the speed pickup can also be a speed sensor cooperating with an axle of a trailer. This embodiment has the advantage that all system components are installed on the trailer, the trailer can be picked up by various tractor vehicles and still the benefits of the invention are achieved. Alternatively, the speed sensor can also work as a wheel sensor or otherwise convert a rotary movement per unit of time into a speed signal.

According to another embodiment, the speed pickup can be formed from the Antilock-System (ABS) of the trailer. The ABS system constantly generates a speed signal, so that no further sensors need to mounted and hooked up.

Depending on the technical outfitting of the tractor vehicle, the CAN-bus if present can also serve as a speed pickup, since a speed signal is also generally available from it.

Preferably, the tension lug can be mechanically locked relative to the tension tube in predetermined positions. In this way, one can achieve a form-fitting locking at discrete distances, which relieves the burden on the actuator. The locking can be realized in particular in the form of one or more radially extending locking means, which engage on the tension tube or tension lug and fit into corresponding detent openings in the other mating part. For an adjustment of the draw bar, the locking means can be taken out of engagement with the mating detent opening by a servomotor, e.g., in the form of a pneumatic cylinder, so that a relative movement between the tension lug and the tension tube is possible. After reaching the changed position, the locking means are again set in place and they fix the tension lug and the tension tube in form-fitting manner. Since the movement of the locking means must be near-simultaneous in an emergency situation, the servomotor should likewise be operated by the same electronic controller as the actuator. A manual activation would be too slow and therefore not acceptable for safety reasons.

Preferably, a force measuring element is applied to the tension lug and/or the tension tube, providing a load-dependent signal to the electronic controller. This can be advisable, since a loaded trailer in event of a panic braking or a fast avoidance maneuver has a tendency to substantial load-shifting reactions. These anticipated load-shifting reactions can be taken into account by allowing for the load-dependent signal when adjusting the automatic gap by the electronic controller. Strain gage strips or piezoelectric sensors can be used as the force measuring element, for example.

Advisedly, the actuator has hydraulic, electromechanical or pneumatic operation. It is preferable to use a hydraulic pressure cylinder. By an electromechanical actuator is meant a spindle driven by a motor, on which a spindle nut runs and is prevented from rotating.

The tension tube on the adjustable draw-bar can be configured as a first pipe segment and the tension lug can comprise a second pipe segment, the two pipe segments being concentrically overlapping. If an electromechanical drive is used, it is preferable to use a nonround cross section, especially a square or a polygon profile. These embodiments, thanks to the geometry of the pipe segments, provide protection against rotation of the spindle nut. A configuration of the pipe segments at least partly as a closed hollow profile furthermore allows the components of the system according to the invention to be protected inside one or both hollow profiles. Thus, preferably the actuator can be arranged inside one or both pipe segments.

The actuator can also be driven by a subassembly arranged on or inside one or both pipe segments. Advantageously, the electronic controller is also accommodated on or inside one or both pipe segments.

Preferably the electronic controller is hooked up to at least one additional signal generator for the processing of a vehicle condition signal. In this way, the primary speed-dependent adjustment of the gap while the articulated train is moving along a curve can be further refined, wherein the following embodiments take into account the actually occurring distance of the tractor vehicle from the trailer as additional parameter. This distance between tractor vehicle and trailer can be found either directly by a distance measurement or indirectly by an angle measurement.

If a distance sensor is used, this senses a change in the distance from the trailer to a tractor vehicle located in front of it. It has proven to be especially favorable for the distance sensor to be arranged at the front side of the trailer. From this position, the chassis of the tractor vehicle can be measured especially effectively as it occasionally collides with the trailer. Furthermore, the sensors are located along with the other system components on the trailer and allow the system to operate independently of the outfitting of the tractor vehicle. Alternatively, the distance sensors can also be arranged at the rear of the tractor vehicle or its cargo space.

Advisedly, the distance sensor is arranged spaced apart to the side of the lengthwise axis of the trailer. The actually occurring gap is measured in the region of the outer vehicle corners, since these regions are also the first to collide with the trailer when the articulated train is moving on a curve.

According to an alternative embodiment, the signal generator can also be an angle sensor, which is arranged at the side of the trailer, for example, in the region of a bearing rim, and which detects the change in its angle of rotation.

Advantageously, the angle sensor is a steering sensor, which can be arranged in the area of a steering wheel, steering linkage or steering transmission and which detects a change in the steering angle of the steering wheel, steering linkage, or parts of the steering transmission. Any travel on a curve is initiated by a change in position of these parts of the steering system, so that an especially near-simultaneous signal can be detected before the articulated train begins its actual travel on the curve. This, in turn, makes possible a timely expanding of the hitch and minimizes the risk of a collision between tractor vehicle and trailer.

Another alternative embodiment is to provide the angle sensor as a steering angle sensor, which can be arranged in the area of a front wheel of the tractor vehicle and which detects a change in the steering angle of this front wheel from the position during straight travel.

In another alternative embodiment, the signal generator is the brake system of an attached tractor vehicle or that of the trailer, which in the case of a heavy braking produces a corresponding brake signal. This brake signal can be used within the electronic controller to expand the hitch and adjust a larger gap between tractor vehicle and trailer, since a full braking is often related to a following avoidance maneuver.

For regular driving operation, control programs are advantageously stored in the electronic controller, by which the position of the tension lug relative to the hitch is determined in dependence on the driving speed and the momentary distance or angle as measured by the signal generator.

In the event of a panic braking of the articulated train with concomitant load-shift reactions or a sudden avoidance maneuver, the controller can determine a distance or angle gradient from the change in distance or angle per unit of time and set the actuator in operation in dependence on a distance or angle gradient stored in the controller, which increases or decreases the gap between the tractor vehicle and the trailer.

It has proven to be especially positive to arrange at least one load sensor on the axle or axles of the tractor vehicle and/or the trailer, which measures the axle load and provides the measured value to the electronic controller. This load sensor can be provided in addition or alternatively to the force measuring element arranged on the hitch. It should also be possible to identify a full-cargo or empty trailer in this way and take into account the anticipated driving behavior when adjusting the gap.

BRIEF DESCRIPTION OF THE DRAWINGS

For a better understanding, the invention will now be discussed more closely by means of seven figures. There are shown FIG. 1, a side view of an articulated train with variously adjusted gap.

DETAILED DESCRIPTION OF THE INVENTION

Figure 1:
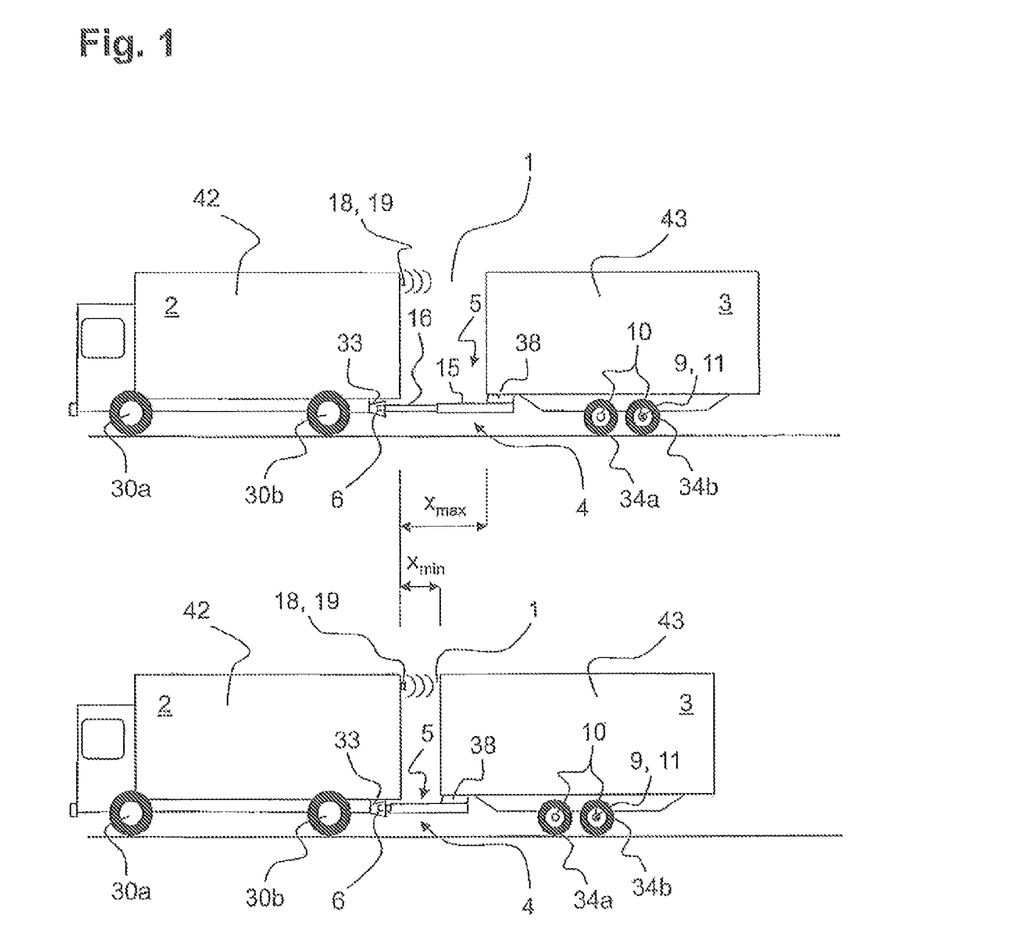

FIG. 1 shows in a side view an articulated train, consisting of a tractor vehicle 2 and an attached trailer 3. Both the tractor vehicle 2 and the trailer 3 have a cargo space 42, 43, which is used for the transport of goods. Usually the tractor vehicle 2 has steerable front wheels 30a and motor-powered rear wheels 30b.

The trailer 3 has a so-called tandem axle with front wheels 34a and rear wheels 34b arranged close to each other in the driving direction. Neither wheel pair 34a, 34b is steerable in the driving direction. The mechanical connection of the trailer 3 to the tractor vehicle 2 is realized by a hitch 4, which comprises a tension tube 5, at whose front end is formed a tension lug 6. The tension lug 6 prior to the start of the drive is introduced into a bolt coupling 33 arranged permanently on the tractor vehicle 2 and held in form-fit by a coupling bolt, not shown. The hitch 4 rigidly engages the trailer 3. For this, a mounting bracket 38 can be provided on the hitch 4, which in turn is screwed to the trailer chassis.

A gap 1 is present between the tractor vehicle 2 and the trailer 3, which in the top drawing is formed with a maximum distance xmax and in the bottom drawing with a minimum distance xmin. The large distance xmax enables a maneuvering and driving on narrow curves, when the corner of the cargo space 42 facing the trailer 3 and the corner of the cargo space 43 facing the tractor vehicle can approach each other on the inside of the curve, or even bump each other and cause damage. When the articulated train is moving fast on a straight stretch, no sharp curves are possible, so that the distance x between tractor vehicle 2 and trailer 3 and thus the gap 1 can be shortened. This results in better air flow across the gap 1 and less turbulence, so that the fuel consumption and pollution emissions of the articulated train are reduced.

The detecting of the current speed of travel is done internally to the system by means of a speed pickup 9 located on the trailer 3. The speed pickup 9 in the embodiment of FIG. 1 is arranged as a speed sensor 11 on one of the axles 10 of the trailer 3. The actual speed of the trailer 3 is determined from the number of revolutions of the axle 10 per unit of time and processed in an electronic controller 8 (see FIGS. 2 and 3) into a signal for adjusting the distance x.

Reducing of the distance x occurs by a telescoping of the hitch 4. The tension tube 5 permanently engaging the trailer 3 forms a first pipe segment 15, in which a second pipe segment 16 that can be adjusted in the lengthwise direction of the vehicle is movably held. The tension lug 6 is an integral part of the second pipe segment 16.

The particular distance x that is set is detected by a distance sensor 19 arranged on the back side of the tractor vehicle 2 and used in adjusting the intended gap 1.

Figure 2:
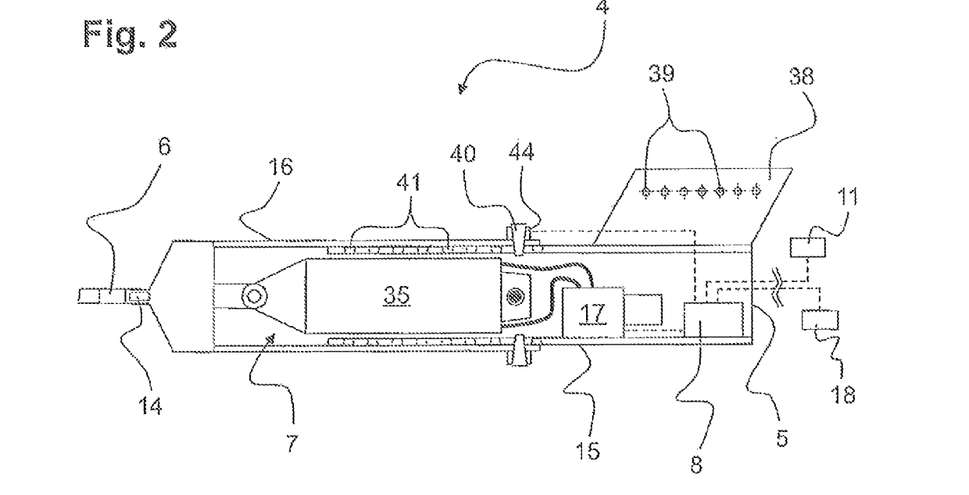
FIG. 2, a side view of a telescopic hitch according to a first embodiment.

FIG. 2 shows in a side view a first embodiment of the telescoping hitch 4. The hitch 4 comprises a smaller-diameter first pipe segment 15 with a preferably round cross section, which is permanently joined to the mounting bracket 38. The mounting bracket 38, in turn, has several boreholes 39 in its top section for a fastening of the hitch 4 to the trailer 3.

Onto the first pipe segment 15 is shoved coaxially a larger-diameter second pipe segment 16 and movably held in the axial direction by means of an actuator 7. The actuator 7 comprises a pressurized fluid cylinder 35 and is located at least partly inside the contour of the first pipe segment 15. The pressurized fluid cylinder 35 is held permanently inside the first pipe segment 15 by its first end, facing the trailer 3. The opposite, second end of the pressurized fluid cylinder 35 is constantly located inside the contour of the second pipe segment 16 and is permanently fastened to this. The second pipe segment 16, furthermore, carries the tension lug 6 for a detachable fastening of the hitch 4 to a bolt coupling 33 of a tractor vehicle 2 (see FIG. 1). By activating the pressurized fluid cylinder 35, the second pipe segment 16 with the tension lug 6 formed on it can move in linear fashion relative to the first pipe segment 16.

The pressurized fluid cylinder 35 is permanently connected to a subassembly 17 in the form of an electrically operated pump, especially a hydraulic pump. The subassembly 17 is put in operation automatically by an electronic controller 8. Both the subassembly 17 and the electronic controller 8 are advantageously accommodated inside the first and/or second pipe segment 15, 16, with a pipe segment 15, 16 that is fixed in place relative to the trailer 3 being especially suitable—the first pipe segment 15 in the present case.

The electronic controller 8 is joined by data lines at least to the speed sensor 11. Furthermore, as further input quantities, data from another signal generator 18 and a force measuring element 14 arranged on the hitch 4 can be processed by the electronic controller 8.

In order to relieve the actuator 7 of load when a quasi-stationary operating state is attained, locking means 40 are arranged on opposite sides in the circumferential wall of the movable, second, pipe segment 16, which in the descended position engage by form fitting with complementary detent openings 41 of the first pipe segment 15. A plurality of detent openings 41 staggered in the axial direction enables a locking in different positions.

During the adjusting of the hitch 4, the actuator 7 pushes forward the second pipe segment 16 under control by the electronic controller 8 at discrete intervals, so that the locking means 40 can descend into the next detent opening 41. The raising and lowering of the locking means 40 occurs by servomotors 44, which are preferably operated by compressed air. The servomotors 44 are likewise connected directly to the electronic controller 8.

Figure 3:
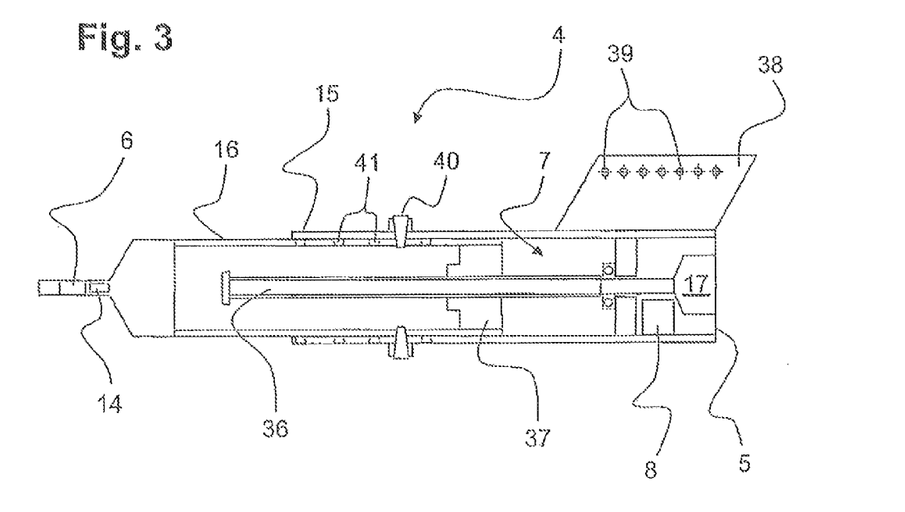
FIG. 3, a side view of a telescopic hitch according to a second embodiment.

FIG. 3 shows an alternative embodiment of the telescoping hitch 4, in which instead of a pressurized fluid cylinder 35 an electromechanical drive with a spindle 36 driven by a subassembly 17 and a spindle nut 37 running thereupon is used as the actuator 7. The spindle 36 here is fixed in its axial direction but can rotate on the first pipe segment 15. The spindle nut 36 is fixed without rotation on the second pipe segment 16 and pushes this in or out of the first pipe segment 15, depending on the direction of rotation of the spindle 35.

According to the embodiment shown in FIG. 3, the first pipe segment 15 permanently arranged on the trailer 3 is of larger diameter and the second pipe segment 16 smaller in diameter, so that the first pipe segment 15 at least partly receives the second pipe segment 16 coaxially. A rotation of the spindle nut 37 or the second pipe segment 16 relative to the first pipe segment 15 can be accomplished in particular by not having a round cross section for the pipe. Instead, square or polygon or elliptical cross sections are especially suitable. If the second pipe segment 16 is to be given a round cross section, axially running rails can also be used to brace the pipe wall against rotation.

Figure 4:
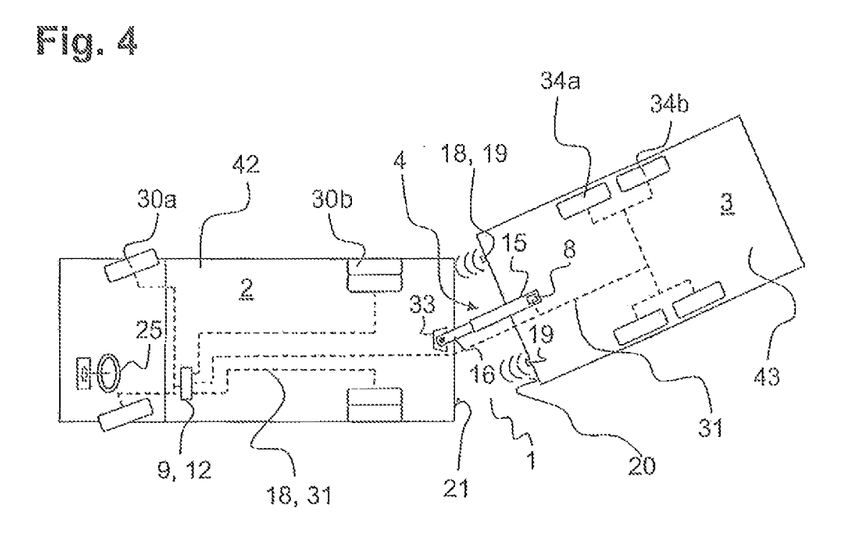
FIG. 4, a schematic top view of an articulated train with another signal generator in the form of a distance sensor.

FIG. 4 shows a schematic top view of an articulated train formed from tractor vehicle 2 and trailer 3. The tractor vehicle 2 and the trailer 3 are outfitted with an ABS 12, in which a speed signal can be picked off at any time. The ABS 12 here serves as a speed pickup 9 for the electronic controller 8. This embodiment is advantageous in that the trailer 3 does not need its own speed sensor 11 to detect the actual speed of travel.

As further input quantities, the electronic controller 8 obtains data from another signal generator 18 in the form of two distance sensors 19 located on the front end 20 of the trailer 3. The distance sensors 19 are each pointed in the direction of travel of the trailer 3 and detect the shortest distance x (see FIG. 1) from the back side 21 of the tractor vehicle 2 on opposite sides of the hitch 4.

As soon as one of the distance sensors 19 recognizes a drop below the predetermined minimum distance, the electronic controller 8 places the actuator 17 in motion (see FIGS. 2 and 3), which increases the length of the hitch 4 and thus the gap 1 by moving apart the first and second pipe segments 15, 16. To prevent trailer 3 and tractor vehicle 2 from bumping together, a telescoping of the hitch 4 should occur when the minimum distance is passed, regardless of the detected speed of travel of the articulated train.

The brake system 31 regulated by the ABS 12 can likewise function as an additional signal generator 18. As soon as the driver activates the brake system 31, the electronic controller 8 also receives a corresponding signal, which can be used to increase the distance x between tractor vehicle 2 and trailer 3 by a telescoping of the hitch 4. When a sharp braking is initiated, the brake system 31 is the first in time to be involved in the process, so that a signal is available very early to the electronic controller 8 to increase the distance x regardless of the actually measured speed of the articulated train.

Figure 5:
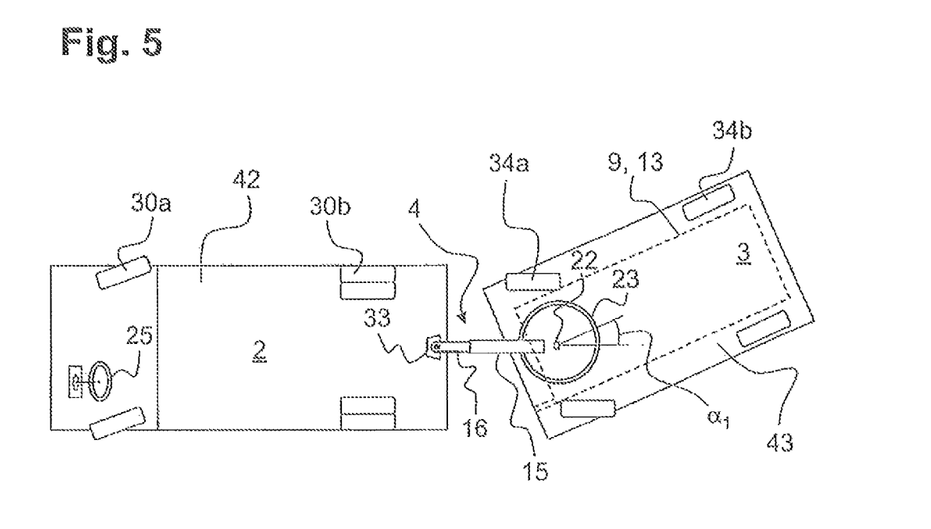
FIG. 5, a schematic top view of an articulated train with another signal generator in the form of an angle sensor in the area of the bearing rim.

FIG. 5 shows an alternative embodiment of the system of the invention, in which the minimum distance between trailer 3 and tractor vehicle 2 is determined indirectly by a change in the relative angle between trailer 3 and tractor vehicle 2.

If the trailer is an articulated trailer 3, it will have a bearing rim 23 beneath its cargo space 43. A change in the angle of rotation $\alpha1$ of the bearing rim 23 relative to straight travel is measured by the angle sensor 22 and relayed to the electronic controller 8, located inside the hitch 4. When a given maximum angle of rotation $\alpha1$ is exceeded, an extension of the hitch 4 occurs thanks to the electronic controller 8. On the other hand, the hitch 4 can be shortened upon passing below the maximum angle of rotation $\alpha1$.

In the embodiment of FIG. 5, the CAN bus 13 serves as the speed pickup 9 for the electronic controller 8.

Figure 6:
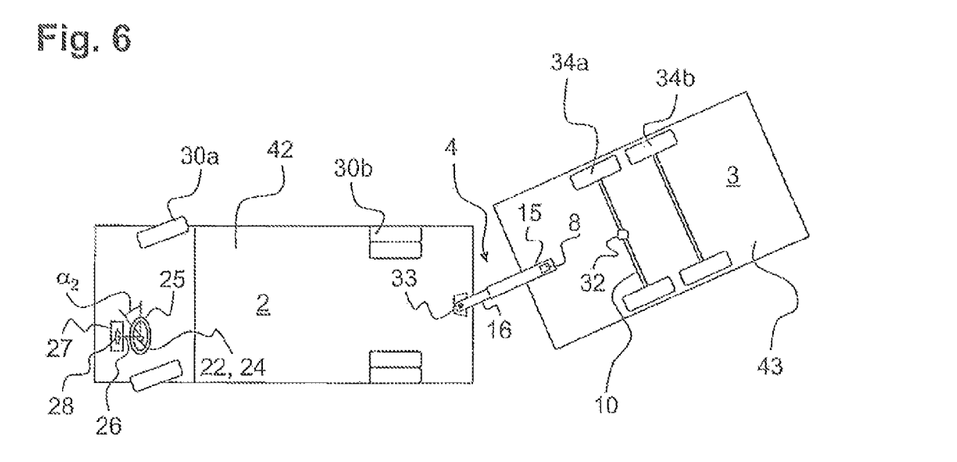
FIG. 6, a schematic top view of an articulated train with another signal generator in the form of a steering sensor.

In FIG. 6, an angle measurement by means of an angle sensor 22 in the form of a steering sensor 24 likewise takes place. In this case, however, due to the hitch 4 rigidly engaging with the trailer 3, the angle sensor 22 is arranged not on the trailer 3, but instead on the tractor vehicle 2, and it measures the steering angle $\alpha2$. The steering angle $\alpha2$ can be picked off in particular from the steering wheel 25, the steering linkage 26, or parts of the steering transmission 27, especially transmission gears. The measured value found in this way is transmitted wirelessly or by data cable from the tractor vehicle 2 to the electronic controller 8 arranged on the trailer 3.

A load sensor 32 arranged on the trailer 3 detects the cargo condition and provides a corresponding measured value to the electronic controller 8. Under full cargo load, the electronic controller 8 can adjust a correspondingly larger distance x in the context of given limit values and thereby compensate for load-shift reactions of the trailer 3. The load sensor 32 is preferably arranged between one of the axles 10 and the cargo space 43.

Figure 7:
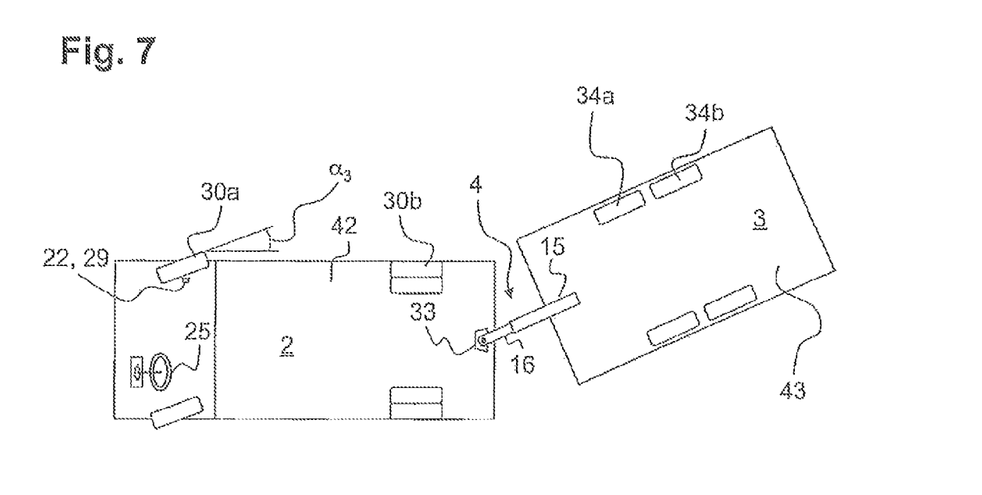
FIG. 7, a schematic top view of an articulated train with another signal generator in the form of a steering angle sensor.

FIG. 7 shows another alternative embodiment of the invention, in which the steering angle $\alpha3$ is detected directly by a steering angle sensor 29 arranged in the area of the steerable front wheels 30a of the tractor vehicle 2. By the steering angle $\alpha3$ is meant the lateral position of the front wheels 30a relative to straight travel. The measured value determined at the tractor vehicle 2 is transmitted to the trailer 3 by means of data cable or wirelessly and provided to the electronic controller 8.

LIST OF REFERENCE SYMBOLS 1 gap
2 tractor vehicle
3 trailer
4 hitch
5 tension tube
6 tension lug
7 actuator
8 electronic controller
9 speed pickup
10 axle, trailer
11 speed sensor
12 ABS
13 CAN bus
14 force measuring element
15 first pipe segment
16 second pipe segment
17 subassembly
18 signal generator
19 distance sensor
20 front side, trailer
21 back side, tractor vehicle
22 angle sensor
23 bearing rim
24 steering sensor
25 steering wheel
26 steering linkage
27 steering transmission
28 part of steering transmission
29 steering angle sensor
30a front wheel, tractor vehicle
30b rear wheel, tractor vehicle
31 brake system
32 load sensor
33 bolt coupling
34a front wheel, trailer
34b rear wheel, trailer
35 pressurized fluid cylinder
36 spindle
37 spindle nut
38 mounting bracket
39 boreholes
40 locking means
41 detent openings
42 cargo space, tractor vehicle
43 cargo space, trailer
44 servomotor
x distance tractor vehicle/trailer
$\alpha1$ angle of rotation, bearing rim
$\alpha2$ steering angle
$\alpha3$ steer angle

What is claimed is:

1. A system for the automatic adjustment of a gap between a tractor vehicle and an attached trailer, comprising: a length-adjustable hitch with a tension tube, at the end of which is arranged a tension lug, while the tension lug can travel in the vehicle's lengthwise axis relative to the tension tube by an actuator along a predetermined travel path, as well as a control unit, wherein the control unit is an electronic controller, which is hooked up to a speed pickup for processing of a speed signal and connected to the actuator, and wherein a characteristic curve is stored in the controller, plotting a constant functional setting of the gap as a function of the current speed.

2. The system according to claim 1, wherein the actuator has hydraulic, electromechanical or pneumatic operation.

3. The system according to claim 2, wherein the tension tube is configured as a first pipe segment and the tension lug comprises a second pipe segment, the two pipe segments being overlapping.

4. The system according to claim 3, wherein the actuator is arranged inside one or both pipe segments.

5. The system according to claim 4, characterized in that wherein the actuator is driven by a subassembly, the subassembly being arranged on or inside one or both pipe segments.

6. The system according to claim 5, wherein the electronic controller is arranged on or inside one or both pipe segments.

7. The system according to claim 1, the electronic controller is hooked up to at least one additional signal generator for the processing of a vehicle condition signal.

8. The system according to claim 7, wherein the signal generator is a distance sensor, which senses a change in the distance (x) from the trailer to a tractor vehicle located in front of it.

9. The system according to claim 7, wherein the signal generator is an angle sensor.

10. The system according to claim 9, wherein the angle sensor is arranged in the region of a bearing rim and it detects a change in its angle of rotation ($\alpha 1$).

11. The system according to claim 9, wherein the angle sensor is a steering sensor, which can be arranged in the area of a steering wheel, steering linkage or steering transmission and which detects a change in the steering angle ($\alpha 2$) of the steering wheel, steering linkage, or parts of the steering transmission.

12. The system according to claim 9, wherein the angle sensor is a steering angle sensor, which can be arranged in the area of at least one front wheel of the tractor vehicle and which detects a change in its steering angle ($\alpha 3$).

13. A system for the automatic adjustment of a gap between a tractor vehicle and an attached trailer, comprising: a length-adjustable hitch with a tension tube, at the end of which is arranged a tension lug, while the tension lug can travel in the vehicle's lengthwise axis relative to the tension tube by an actuator along a predetermined travel path, as well as a control unit, wherein the control unit is an electronic controller, which is hooked up to a speed pickup for processing of a speed signal and connected to the actuator, wherein the speed pickup is a speed sensor cooperating with an axle of a trailer.

14. A system for the automatic adjustment of a gap between a tractor vehicle and an attached trailer, comprising: a length-adjustable hitch with a tension tube, at the end of which is arranged a tension lug, while the tension lug can travel in the vehicle's lengthwise axis relative to the tension tube by an actuator along a predetermined travel path, as well as a control unit, wherein the control unit is an electronic controller, which is hooked up to a speed pickup for processing of a speed signal and connected to the actuator, wherein the speed pickup is formed from an ABS of the trailer or tractor vehicle.

15. A system for the automatic adjustment of a gap between a tractor vehicle and an attached trailer, comprising: a length-adjustable hitch with a tension tube, at the end of which is arranged a tension lug, while the tension lug can travel in the vehicle's lengthwise axis relative to the tension tube by an actuator along a predetermined travel path, as well as a control unit, wherein the control unit is an electronic controller, which is hooked up to a speed pickup for processing of a speed signal and connected to the actuator, wherein the speed pickup is formed from a CAN bus.

16. A system for the automatic adjustment of a gap between a tractor vehicle and an attached trailer, comprising: a length-adjustable hitch with a tension tube, at the end of which is arranged a tension lug, while the tension lug can travel in the vehicle's lengthwise axis relative to the tension tube by an actuator along a predetermined travel path, as well as a control unit, wherein the control unit is an electronic controller, which is hooked up to a speed pickup for processing of a seed signal and connected to the actuator, wherein the tension tube is configured as a first pipe segment and the tension lug comprises a second pipe segment, the two pipe segments being overlapping, wherein the electronic controller is arranged on or inside one or both pipe segments.

17. The system according to claim 16, wherein the actuator is arranged inside one or both pipe segments.

18. The system according to claim 16, wherein the actuator is driven by a subassembly, the subassembly being arranged on or inside one or both pipe segments.

* * * * *

UNITED STATES PATENT AND TRADEMARK OFFICE
CERTIFICATE OF CORRECTION

| | | |
|---|---|---|
| PATENT NO. | : 8,678,420 B2 | Page 1 of 1 |
| APPLICATION NO. | : 13/365475 | |
| DATED | : March 25, 2014 | |
| INVENTOR(S) | : Manuel Gallego et al. | |

It is certified that error appears in the above-identified patent and that said Letters Patent is hereby corrected as shown below:

In the Claims

Column 10, line 38, Claim 16 "seed" should be replaced with --speed--.

Signed and Sealed this
Tenth Day of June, 2014

Michelle K. Lee
*Deputy Director of the United States Patent and Trademark Office*